United States Patent
Andersen et al.

(10) Patent No.: US 9,441,780 B2
(45) Date of Patent: Sep. 13, 2016

(54) UNBONDED FLEXIBLE PIPE AND PIPE SYSTEM

(75) Inventors: Svend Vogt Andersen, Fredensborg (DK); Charlotte Larsen, Vipperød (DK)

(73) Assignee: NATIONAL OILWEKK VARCO DENMARK I/S, Brondby (DK)

( * ) Notice: Subject to any disclaimer, the term of this patent is extended or adjusted under 35 U.S.C. 154(b) by 351 days.

(21) Appl. No.: 14/116,838

(22) PCT Filed: May 10, 2012

(86) PCT No.: PCT/DK2012/050160
§ 371 (c)(1),
(2), (4) Date: Dec. 6, 2013

(87) PCT Pub. No.: WO2012/155912
PCT Pub. Date: Nov. 22, 2012

(65) Prior Publication Data
US 2014/0124079 A1 May 8, 2014

(30) Foreign Application Priority Data

May 13, 2011 (DK) .................................. 2011 00370
May 26, 2011 (DK) .................................. 2011 00402

(51) Int. Cl.
*F16L 11/00* (2006.01)
*F16L 9/14* (2006.01)
(Continued)

(52) U.S. Cl.
CPC ................ *F16L 59/143* (2013.01); *B32B 1/08* (2013.01); *B32B 25/10* (2013.01); *F16L 11/083* (2013.01); *F16L 11/10* (2013.01); *F16L 59/153* (2013.01);
(Continued)

(58) Field of Classification Search
CPC ........................................................ B32B 1/08
USPC .......................... 138/134, 137, 138, 143, 149
See application file for complete search history.

(56) References Cited

U.S. PATENT DOCUMENTS

| 4,458,723 A | * | 7/1984 | Nojiri | .................... B29C 44/22 138/149 |
| 4,549,581 A | | 10/1985 | Unno | |

(Continued)

FOREIGN PATENT DOCUMENTS

| EP | 0 026 431 A1 | 4/1981 |
| EP | 1 119 684 | 8/2001 |

(Continued)

OTHER PUBLICATIONS

Extended European Search Report for 12 78 6136 dated Jan. 27, 2015.

(Continued)

*Primary Examiner* — Paul R Durand
*Assistant Examiner* — Vishal Pancholi
(74) *Attorney, Agent, or Firm* — Pearne & Gordon LLP

(57) ABSTRACT

The invention relates to an unbonded flexible pipe comprising a first pipe end, and a second pipe end. The pipe comprises a plurality of whole length layers extending from the first pipe end to the second pipe end and comprising at least a tubular inner sealing sheath, at least one armor layer, an outer protective layer and at least one thermally insulating layer arranged between the internal sealing sheath and the outer protective layer in an insulated length section. The at least one thermally insulating layer is terminated at a distal termination point in a distance from at least one of the first and the second pipe end of the unbonded flexible pipe.

27 Claims, 5 Drawing Sheets

(51) Int. Cl.
| | |
|---|---|
| F16L 59/14 | (2006.01) |
| F16L 59/153 | (2006.01) |
| F16L 11/08 | (2006.01) |
| F16L 11/10 | (2006.01) |
| F16L 59/16 | (2006.01) |
| B32B 25/10 | (2006.01) |
| B32B 1/08 | (2006.01) |

(52) U.S. Cl.
CPC ......... *F16L 59/16* (2013.01); *B32B 2307/304* (2013.01); *B32B 2597/00* (2013.01)

(56) References Cited

U.S. PATENT DOCUMENTS

| | | | |
|---|---|---|---|
| 5,730,188 | A | 3/1998 | Kalman |
| 5,813,439 | A | 9/1998 | Herrero |
| 6,110,550 | A | 8/2000 | Jarrin |
| 6,123,114 | A | 9/2000 | Seguin |
| 6,145,546 | A | 11/2000 | Hardy |
| 6,192,941 | B1 | 2/2001 | Mallen-Herrero |
| 6,283,161 | B1 | 9/2001 | Feret |
| 6,354,333 | B1 | 3/2002 | Dupoiron |
| 6,408,891 | B1 | 6/2002 | Jung |
| 6,454,897 | B1 | 9/2002 | Morand |
| 6,668,866 | B2 | 12/2003 | Glejbol |
| 6,668,867 | B2 | 12/2003 | Espinasse |
| 6,691,743 | B2 | 2/2004 | Espinasse |
| 6,923,477 | B2 | 8/2005 | Buon |
| 6,978,825 | B1 | 12/2005 | Baylot |
| 2004/0066035 | A1* | 4/2004 | Buon .................. F16L 33/003 285/222.2 |
| 2008/0072988 | A1* | 3/2008 | Elgendy ............. F16L 58/1054 138/149 |
| 2009/0322077 | A1* | 12/2009 | Eccleston ............... F16L 33/01 285/337 |

FOREIGN PATENT DOCUMENTS

| | | |
|---|---|---|
| EP | 1 255 944 | 11/2002 |
| EP | 1 269 057 | 1/2003 |
| EP | 1 269 058 | 1/2003 |
| EP | 1 277 007 | 1/2003 |
| EP | 1 384 026 | 1/2004 |
| EP | 1 475 650 A1 | 11/2004 |
| EP | 1 867 905 B1 | 12/2007 |
| EP | 1 937 751 | 7/2008 |
| GB | 500997 | 7/1938 |
| WO | 00/17479 A1 | 3/2000 |
| WO | 00/36324 A1 | 6/2000 |
| WO | 01/51839 A1 | 7/2001 |
| WO | 01/61231 A1 | 8/2001 |
| WO | 01/61232 A1 | 8/2001 |
| WO | 01/81809 A1 | 11/2001 |
| WO | 02/42674 A1 | 5/2002 |
| WO | 02/090818 A1 | 11/2002 |
| WO | 2007/042049 A1 | 4/2007 |
| WO | 2008/113362 A1 | 9/2008 |
| WO | 2009/106078 A1 | 9/2009 |
| WO | 2011/026801 A1 | 3/2011 |
| WO | 2011/079845 A1 | 7/2011 |

OTHER PUBLICATIONS

"Recommended Practice for Flexible Pipe" ANSI/API Recommended Practice 17B, Fourth Edition, Jul. 2008.
"Specification for Unbonded Flexible Pipe" ANSI/API Specification 17J, Third Edition, Jul. 2008.
Search Report and Written Opinion issued is Application No. DK PA 2011 00402 dated Dec. 2, 2011.
International Preliminary Report on Patentability issued in Application No. PCT/DK2012/050160 dated Nov. 19, 2013.
International Search Report issued in Application No. PCT/DK2012/050160 dated Jul. 16, 2012.

* cited by examiner

UNBONDED FLEXIBLE PIPE AND PIPE SYSTEM

The invention relates to an unbonded flexible pipe for the transport of hydrocarbons, such as transport of hydrocarbons to or from offshore installations, for example comprising transporting hydrocarbons under sea level. The invention further relates to a system comprising the unbonded flexible pipe and the use of the system.

Unbonded flexible pipes of the present type are well known in the art, in particular for offshore transportation of fluids. Such pipes usually comprise an inner liner often referred to as an inner sealing sheath or an inner sheath, which forms a barrier against the outflow of the fluid conveyed through the pipe, and one or more armouring layers on the outer side of the inner liner (outer armouring layer(s)). An outer sheath may be provided with the object of providing a mechanical protection and/or for forming a barrier against the ingress of fluids from the pipe surroundings to the armouring layers.

As used in this text the term "unbonded" means that at least two of the layers including the armouring layers and polymer layers are not bonded to each other. In practice the known pipe normally comprises at least two armouring layers located outside the inner sealing sheath. In unbonded pipes, the armouring layers are not bonded to each other or to other layers directly or indirectly via other layers along the pipe. The pipe layers can therefore move relative to each other, and thereby the pipe becomes highly bendable, usable for dynamic applications e.g. as risers, and sufficiently flexible to roll up for transportation even when the layers are relatively thick, which is necessary for high strength pipes which should be able to withstand high pressure differences over layers of the pipe e.g. pipe differences between the pressure inside the bore of the pipe and the pressure on the outer side of the pipe.

In the standard usually applied for unbonded flexible pipe API specification 17 J "Specification for unbonded flexible pipe", third edition, published by American Petroleum Institute, and API specification 17 B "Recommended Practice for Flexible Pipe" fourth edition published by American Petroleum Institute additional information on the general state of the art of unbonded flexible pipes can be found.

The layers of the flexible pipe of the invention such as the inner sealing sheath and layers surrounding the inner sealing sheath may be as described above and for example as known from the prior art. Also the flexible pipe may in one embodiment comprise a carcass, e.g. be a rough bore pipe. In another embodiment it is without such carcass, e.g. a smooth bore pipe.

The unbonded flexible pipe of the flexible pipe system according to the invention may for example have a structure as described in any one of the documents EP 1255944, EP 1269057, EP 1384026, EP 1475650, EP 1277007, EP 1269058, EP 1119684, U.S. Pat. Nos. 6,123,114, 6,691,743, 6,668,867, 5,813,439, WO 0242674, U.S. Pat. Nos. 5,730,188, 6,354,333, 4,549,581, 6,192,941, 6,283,161, WO 0181809, WO 0036324, U.S. Pat. Nos. 6,454,897, 6,408,891 and U.S. Pat. No. 6,110,550, WO2009106078, WO 2008113362, EP 1937751, U.S. Pat. Nos. 6,145,546, 6,123,114 and U.S. Pat. No. 6,668,866 with the difference that the unbonded flexible pipe comprises a thermally insulating layer arranged as described herein according to the invention.

It is an object of the invention to provide a new unbonded flexible pipe, a flexible pipe system and use of the flexible pipe system that overcomes or ameliorates at least one of the disadvantages of the prior art or which provides a useful alternative thereto.

An object of the invention is achieved by an unbonded flexible pipe, suitable for transporting hydrocarbon fluids, having a length along a longitudinal axis, a first pipe end, a second pipe end and comprising a plurality of whole length layers extending from the first pipe end to the second pipe end. The plurality of whole length layers comprises at least a tubular inner sealing sheath, at least one armour layer and an outer protective layer. The unbonded flexible pipe further comprises at least one thermally insulating layer arranged between the internal sealing sheath and the outer protective layer in an insulated length section. The flexible pipe comprises an inner part comprising at least the internal sealing sheath and any other whole length layers being internal to the thermally insulating layer. The flexible pipe further comprises an outer part comprising at least the outer protective layer and any other whole length layers being external to the thermally insulating layer. The at least one thermally insulating layer is terminated at a distal termination point, the distal termination point being in a distance from at least one of the first and the second pipe ends of the unbonded flexible pipe.

In this way, an optimized unbonded flexible pipe may be achieved, in which the thermally insulating layer may be included in the pipe only where it is needed. Thus, material use may be minimised thereby saving costs. Such pipe sections needing insulation may e.g. be where the pipe is embedded in a sea floor (i.e. trenched, crosses another pipeline) for example due to otherwise rapid loss of heat from the fluids within, or where the pipe is covered on an outside thereof by e.g. ancillary components, such as support and/or connection modules, components or structures. At these pipe regions, heat emanating from the pipe could otherwise be largely accrued herein.

The flexible pipe according to the present invention has shown to be highly suitably for transportation of hydrocarbons in cases where the hot hydrocarbons transported by the flexible pipe reach high temperatures, such as around 125° C. or above. By the present invention any risk that the materials of the pipe, such as the inner and outer polymer sheath, armour layer materials should deteriorate are highly decreased.

The flexible pipe according to the present invention thereby provides a construction where the insulation in an economical way is arranged to protect selected parts of the pipe and/or support and/or connection components from undesired deteriorating due to heat. Such selected parts may for example be in the pipe connection sections or in the pipe support sections along the pipe, when in use, e.g. where the pipe is covered by other components or by sand.

In the context of the present invention, a thermally insulating layer is defined as any layer having a thermal resistance R-value of about 0.1 or more, such as about 0.5 or more, even such as about 1 or more, or about 2 or more, relative to the thermal resistance of the tubular inner sealing sheath.

Alternatively, a thermally insulating layer may be defined to be any layer having a thermal resistance R-value of about 0.1 or more, such as about 0.5 or more, even such as about 1 or more, or about 2 or more, relative to the thermal resistance of the outer protective layer. In one embodiment, the outer protective layer is an extruded layer, which may be impermeable to water. Alternatively, the extruded layer may be perforated or in another way be made permeable to water. In other embodiments, the outer protective layer may be one or more wound layer(s).

In one embodiment, the unbonded flexible pipe comprises at least one thermally insulated pipe section comprising the at least one thermally insulating layer and at least one non-insulated pipe section without a thermally insulating layer.

In one embodiment, the unbonded flexible pipe comprises a first end fitting at its first pipe end and a second end fitting at its second pipe end, the plurality of whole length layers are fixed to the first and the second end fitting.

The at least one thermally insulating layer is not directly fixed to the first end fitting or not directly fixed to the second end fitting or not directly fixed to any end fitting. In this way, the first and/or the second end fitting may have a simpler construction in that the at least one thermally insulating layer is not present where the end fitting is to be mounted on the pipe. For example each thermally insulating layer on the pipe can be provided with a substantial thickness in a radial direction, e.g. about 5 to about 10 cm or larger. Consequently, the process of applying the end fitting to the pipe end is also made simpler as the step(s) of fixing the thermally insulating layer to the end fitting is not required.

In one embodiment, the at least one thermally insulating layer has a first and a second insulating layer end, the first insulating layer end is closer to the first pipe end and the second insulating layer end is closer to the second pipe end. The first insulating layer end is optionally fixed to a first end fitting and the distal termination point of said second insulating layer end is provided at a second end fitting distance along the length of the pipe to a second end fitting.

In one embodiment, the insulated length section has a length of about 95% or less of the length of the pipe, such as about 90% or less, such as about 50% or less, such as about 10% or less, such as about 5% or less. Thus, an efficient solution may be achieved, where the extra cost associated with insulating the pipe is minimized while the insulation is still used where it is required. By providing only selected pipe length sections with insulation, such as only length sections, where the pipe is in contact with support or connection components, it is possible to both prolong the lifetimes of the pipe and components being used, as well as reducing the total heat losses experienced along the total length of the pipe. A further advantage of this section-wise insulation layer provision is, that the total weight of the pipe may be decreased substantially, reducing the environmental impact of e.g. a riser utilization process.

In one embodiment, at least one of the first and the second pipe ends is connected to an end fitting such that the whole length layers are fixed to the end fitting, such as independently and/or individually fixed to the end fitting. In one embodiment the thermally insulating layer may or may not be fixed to the end fitting. The thermally insulating layer is not fixed to at least one end fitting of the pipe.

In one embodiment, the at least one thermally insulating layer is truncated at the distal termination point. By merely truncating the thermally insulating layer, a very simple transition from the insulated length section to the section of the pipe without the thermally insulated layer is achieved. The truncation may be made perpendicularly to the longitudinal axis of the pipe. Alternatively, the truncation may be made at another angle, e.g. to allow for a less abrupt change in diameter for the outer part of the pipe.

For example, the truncation may be made at a different angle, within a range of about 1° to about 179° relative to the longitudinal axis of the pipe, e.g. to allow for a less abrupt change in diameter, in particular for enabling a less steep transition for the outer protective layer of the outer part of the pipe. The angle range can be selected such that the termination point of the insulation layer is either provided on the top point or the bottom point of the insulation layer relative to the underlying layer upon which the insulation layer is provided. Depending on the relative flexibility of the insulation layer material being used, the part of the insulation layer protruding out over the pipe length may be relatively easily bent down towards the underlying layer, e.g. during the laying of the outer protective layer. Both such under-cut angle and over-cut angle provide the pipe with a better resistance against risks of accidental protective layer breakage due to wear and/or if the transition area experiences blows thereon.

In one embodiment, the at least one thermally insulating layer is in contact with or in close proximity to an anchoring element at the distal termination point. Thus, the end of the thermally insulating layer at the distal termination point may be secured within the pipe structure during production and/or use of the pipe. This is also an advantage during use of the pipe, e.g. as a riser when only one or no insulation layer end is fixed to the pipe using end fittings, since there is a potential risk that such insulation layer end during use in dynamic applications can be damage by such end fitting or it may escape from the end fitting in an uncontrolled way.

In one embodiment, the anchoring element is fixed to the thermally insulating layer. In this way, it is ensured that the anchoring element does not become separated from the thermally insulating layer, e.g. during production. It also simplifies the pipe production process, as the anchoring element may be constituted by several anchoring parts, which can be provided in a step after extrusion of the insulation layer.

In one embodiment, the anchoring element is movable over an outermost layer of the inner part. Thus, a maximum of flexibility of the flexible pipe is achieved.

In one embodiment, the anchoring element is fixed to an outermost layer of the inner part. In this way, it is ensured that the anchoring element is kept in place, also during production, while the flexibility of the pipe is maintained.

In one embodiment, the anchoring element is fixed to an innermost layer of the outer part. This is an alternative way of ensuring that the anchoring element is kept in place, while the flexibility of the pipe is maintained. Fixing the anchoring element to an innermost layer of the outer part may e.g. simply be achieved by extruding a layer tightly over the anchoring element, such that a friction fit is achieved. The skilled person will realise many other ways of fixing the anchoring element to the layer.

In one embodiment the at least one thermally insulating layer is in contact with or in close proximity to several anchoring elements.

In one embodiment, the anchoring element comprises tape. In this way, the thermally insulating layer may be conveniently fixed to underlying layers by the tape. Alternatively, the anchoring element may be conveniently fixed to the thermally insulating layer by the tape.

In one embodiment, the anchoring element comprises a transition ring having an inner opening corresponding to the inner part of the flexible pipe. The inner part passes through the inner opening. The transition ring has an outer surface, the outer surface being configured to provide a gradual transition in a diameter to the layers of the outer part from the insulated length section at the distal termination point. Thus, the transition ring acts to smoothen the change in diameter of the flexible pipe from the insulated length section to the part of the pipe without the thermally insulating layer. In this way, the layers of the outer part are relieved from abrupt diameter changes and are therefore better able to adapt to the diameter change of the underlying layers.

In one embodiment, the transition ring has a cross-section in an axial cross-section of the pipe, the cross-section having an outer shape being substantially triangular. A first side of the substantially triangular cross-section corresponds to an outer surface of the inner part of the pipe, a second side corresponds to a thickness of the thermally insulating layer, and the third side being the outer surface.

In one embodiment, the transition ring comprises two or more transition ring elements. In this way, mounting of the transition ring during production is eased, since the transition ring may be assembled or arranged at the desired point without needing to be moved in position from an end of the pipe. The transition ring elements may be attached to each other to form an assembled transition ring. Alternatively, the transition ring elements may be arranged independently, optionally being held in place during production by a temporary holding means. Preferably, the ring elements are provided in a stepped-down configuration of reduced outer diameters.

In one embodiment, the thermally insulating layer is arranged between the armour layer and the outer protective layer. Thus, the thermally insulating layer may serve to protect the outer protective layer from being over-heated by e.g. hot fluids being transported in the flexible pipe.

In one embodiment, the unbonded flexible pipe comprises more than one armour layer, the thermally insulating layer being arranged between an outermost armour layer and the outer protective layer. Thus, the thermally insulating layer is protected from being crushed by a high contact pressure from the outermost armouring layer when the pipe is under tension, e.g. during operation or laying of the pipe.

In one embodiment, the inner part comprises from the inside out an optional inner armouring layer, the tubular inner sealing sheath, and the at least one armour layer.

In one embodiment, the outer part consists of the outer protective layer.

In one embodiment, the insulated length section has a length of about 100 m or less, such as about 50 m or less, or even such as about 20 m or less. In this way, the thermally insulating layer may be applied just where needed.

The skilled person will realise that many different thermally insulating materials may be used in the at least one thermally insulating layer.

In a particular embodiment, the at least one thermally insulating layer comprises PVDF, PP, PVC, or PU. These materials are able to withstand a significant hydrostatic pressure commonly encountered by flexible pipes.

In one embodiment, the outer protective layer comprises a material in the group of PA11, PE, MDPE, HDPE, PA12, or PEX. In this way, the thermally insulating layer allows for the use of outer protective layer materials which would otherwise not be usable, e.g. due to a too high temperature. Thus, the need for use of more expensive materials may be reduced or alleviated.

In one embodiment, the thermally insulating layer comprises PVDF and has a thickness from about 1 mm to about 100 mm, such as from about 2 mm to about 80 mm, or even from about 4 mm to about 60 mm. A thermally insulating layer may be wound from bands of an insulation material, with one or more sub-layers of bands being used to provide a desired thickness of the thermally insulating layer.

In one embodiment, the thermally insulating layer comprises PP and has a thickness from about 1 mm to about 100 mm, such as from about 2 mm to about 80 mm, or even from about 4 mm to about 60 mm.

In one embodiment, the pipe in a cross-section comprises at least a first thermally insulating layer having at least one first distal termination point and second thermally insulating layer having at least one second distal termination point. For instance, the first thermally insulating layer may comprise a first insulating material and the second thermally insulating layer may comprise a second insulating material, e.g. one or both of the insulating materials being of the abovementioned types. In this way, the insulating properties of the pipe may be tailored with regards to e.g. mechanical and thermal properties and material cost. The first and second thermally insulating layers may be terminated at different distal termination points, e.g. having a distance between the first and second termination point of about 1 m or more, such as about 3 m or more, or even about 5 m or more, or of about 20 m or less, such as about 15 m or less, or even about 10 m or less.

In one embodiment, the pipe comprises two, three, four, or more insulated length sections.

An object of the invention is also achieved by a flexible pipe system comprising an unbonded flexible pipe according to any of the abovementioned embodiments and an ancillary component. The ancillary component is attached to or arranged in a close proximity to the flexible pipe over an interaction length section of the pipe. The insulated length section of the pipe comprises at least a part of the interaction length section. The ancillary component and/or the outer protective layer may comprise materials having a reduced lifetime if subject to elevated temperatures, e.g. due to hydrolysis and/or oxidation. Ancillary components are generally located on or in proximity to surfaces of flexible pipes and will therefore typically change the cooling properties of the pipe surface, e.g. in effect insulate the outer protective layer. Therefore, layers of the pipe it self or of the ancillary component may be subject to local overheating, while a remaining length of the pipe may not have this problem. Thus, it is advantageous to locally insulate the pipe at or around such "hot-spots". By this configuration of the system, the ancillary component and/or outer protective layer may be thermally protected by the thermally insulating layer, while other sections of the flexible pipe, e.g. directly cooled by being in contact with sea water, may not need insulation. In this way, the need to insulate the full length of the pipe may be overcome, resulting in a lower weight of the pipe and/or the pipe system, and a reduction in material use and/or material cost.

In an embodiment of the flexible pipe system, the insulated length section comprises substantially the whole interaction length section.

In an embodiment of the flexible pipe system, the ancillary component is chosen from the group of: a guide tube, a bend limiter, a bend stiffener, a bellmouth, a bend restrictor, a connector, a sub-sea buoy, a buoyancy module, a clamping device, a riser base, a tether base, and a riser hang-off structure.

In an embodiment of the flexible pipe system, the ancillary component is any component or structure arranged on a surface of the unbonded flexible pipe or in proximity to the surface along a part of the length of the pipe, wherein the ancillary component during use of the pipe system reduces heat transfer from the pipe surface to a pipe surrounding along the interaction length section. Thus, the ancillary component reduces the heat transfer from the pipe surface, compared to the heat transfer from the pipe surface away from the interaction length section.

In an embodiment of the flexible pipe system, the system additionally comprises a second ancillary component being attached to or arranged in a close proximity to the flexible pipe over a second interaction length section of the pipe. The insulated length section and/or a second insulated length section comprise at least a part of the second interaction length section. Thus, multiple ancillary components may be arranged on a single insulated length section, or alternatively, each ancillary component may have its own separate insulated length sections. The skilled person will realize that a combination is also possible, e.g. a riser in a wave configuration having one insulated length section corresponding to a pipe section within a guide tube and one insulated length section corresponding to a pipe section having a number of buoyancy modules mounted thereto.

In an embodiment of the flexible pipe system, the ancillary component is a bend stiffener configured to limit bending in a stiffened region of the unbonded flexible pipe, the interaction length section comprising the stiffened region. The insulated length section comprises at least a part of the stiffened region.

In an embodiment of the flexible pipe system, the bend stiffener is connected to an end fitting, the end fitting being connected to the unbonded flexible pipe. The thermally insulating layer may be fastened to the end fitting. Alternatively, the thermally insulating layer may be terminated at a distance from the end fitting.

In an embodiment of the flexible pipe system, the bend stiffener is connected to a support structure, the flexible pipe being arranged to pass through the bend stiffener and the support structure. The insulated length section additionally comprises at least a part of the pipe section passing through the support structure. The support structure may be e.g. a riser guide tube wherein the bend stiffener is attached to an exit port thereof. The guide tube may be of any type, e.g. an I- or J-tube.

In an embodiment of the flexible pipe system, the insulated length section comprises substantially the whole length of the support structure. In this way, possible problems of over-heating caused by an insulating effect of the support structure may be relieved by the thermally insulating layer.

In an embodiment of the flexible pipe system, the insulated length section also comprises substantially the whole length of the stiffened region.

Finally, an object of the invention is achieved by use of the flexible pipe system according to any of the abovementioned embodiments for transport of fluid. The fluid has a service temperature of 60° C. or more, such as of 70° C. or more, such as 100° C. or more, such as 130° C. or more, or even of 150° C. or more. The service temperature is here defined as the temperature of the fluid in the bore of the unbonded flexible pipe during normal service of the pipe.

In one use of the invention, the at least one thermally insulating layer is configured to be sufficiently insulating to keep the service temperature of the outer protective layer and/or the ancillary component at about 130° C. or less, such as at about 100° C. or less, such as at about 70° C. or less, or even at about 60° C. or less. In this way, cumbersome steps, such as cooling of the fluid before being transported in the pipe may be avoided, while the need for insulating the full length of the pipe is also avoided. The service temperature is here defined as the highest temperature of the outer protective layer during normal service of the pipe, i.e. typically on the inside of the outer protective layer.

In an embodiment of the unbonded flexible pipe the at least one thermally insulating layer is not provided as a whole length layer.

In an embodiment of the unbonded flexible pipe it comprises a first end fitting at its first pipe end and a second end fitting at its second pipe end, the plurality of whole length layers are fixed to the first and to the second end fitting, wherein one end of said at least one thermally insulating layer is fixed to the first end fitting or to the second end fitting. Thus, one of said first insulating layer ends is fixed to one end fitting, while the second insulating layer end of the same at least one thermally insulating layer is not fixed to any end fitting. Thus, e.g. when being used as a riser, see FIG. 10, the flexible pipe is held fixed to the floating installation. This fixed end of the pipe is provided with an end fitting (not shown), which houses and fixes both the multiple whole length layers as well as said at least one insulation layer end.

In an embodiment of the unbonded flexible pipe said distance between said distal termination point of said at least one thermally insulating layer and said at least one of the first and the second pipe end of the unbonded flexible pipe lies within a range of less than 99%, such as less than 95%, such as less than 90%, such as less than 80%, such as less than 75%, such as less than 60%, such as less than 50% of the pipe length. In practice, the distal termination point is provided such that one or more non-insulated length sections can be accommodated within said distance. Said distance is also larger than zero, and preferably said distance is of a size in meters, which accommodates a pipe length, over which said at least one insulation layer is not provided.

In an alternative embodiment, one or more of said whole length layers comprise a thermally insulating layer. Such layer may be of a reduced thickness compared to the thermally insulating layer which is not provided as a whole length layer. The insulated pipe length section is accordingly provided with a further, such as more than one insulation layer. This may result in an increased radius of the insulated length section.

In an alternative embodiment, said at least one thermally insulating layer is not a whole length layer.

The invention will be explained more fully below in connection with preferred embodiments and with reference to the drawings in which.

The figures are schematic and may be simplified for clarity. Throughout, the same reference numerals are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent from this detailed description to those skilled in the art.

Figure 1:
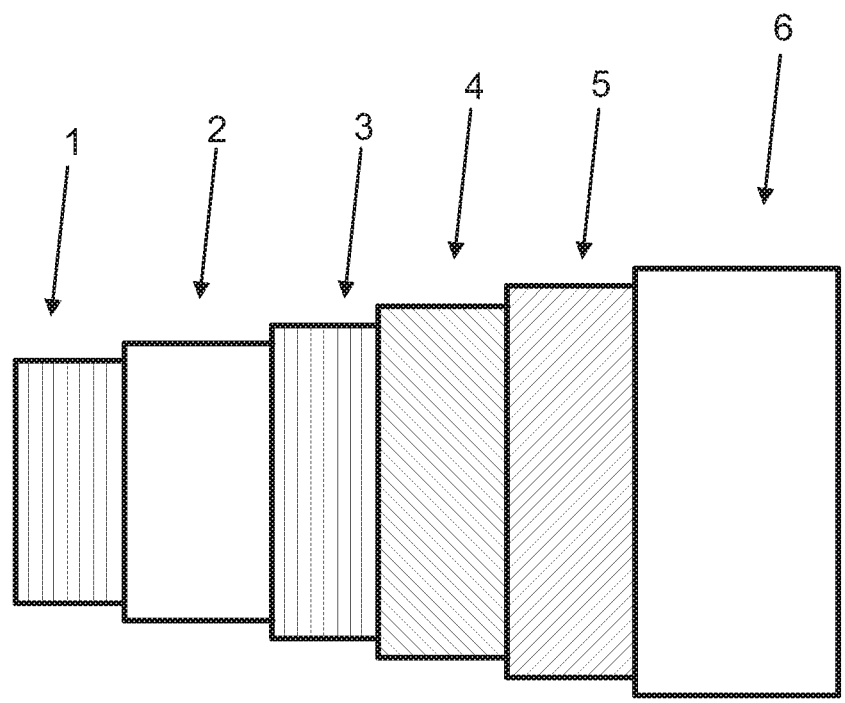
FIG. 1 is a schematic side view of a flexible pipe with a carcass.

The flexible pipe shown in FIG. 1 comprises a tubular inner sealing sheath 2, often also called an inner liner, e.g. of cross linked poly ethylene (PEX). Inside the inner sealing sheath 2 the pipe comprises an internal armouring layer 1, called a carcass. On the outer side of the inner sealing sheath 2, the flexible pipe comprises three outer armouring layers 3, 4, 5. The outer armouring layer 3 closest to the inner sealing sheath 2 is a pressure armouring layer 3, made from profiles and/or strips wound with a short pitch and thereby at a steep angle to the centre axis of the pipe, e.g. close to 90 degrees. Around the pressure armouring layer 3, the pipe comprises a pair of cross wound tensile armouring layers 4, 5, made from wound profiles and/or strips. The tensile armouring layers 4, 5 are normally cross wound with equal or different angles of 70 degrees or less, typically 60 degrees or less, such as 55 degrees or less, such as between 20 and 55 degrees. The pipe further comprises an outer polymer layer (outer protective layer) 6 protecting the armouring layer mechanically and/or against ingress of sea water. The materials used are well known in the art.

Between the inner sealing sheath 2 and the outer sheath is provided an annulus, also called an annulus cavity. In this annulus cavity the pressure armouring layer 3 and the tensile armouring layers 4, 5 are placed. The armouring layers are not fluid tight.

The flexible pipe is a harvesting pipe for transporting oil, gas or similar fluids from a well to a collecting unit such as a sea surface installation (usually a ship or a platform). A bore defined by the inner sealing sheath 2 (i.e. the area surrounded by the inner side of the inner sealing sheath) provides a transportation path. The internal armouring layer 1 is placed in the bore.

Figure 2:
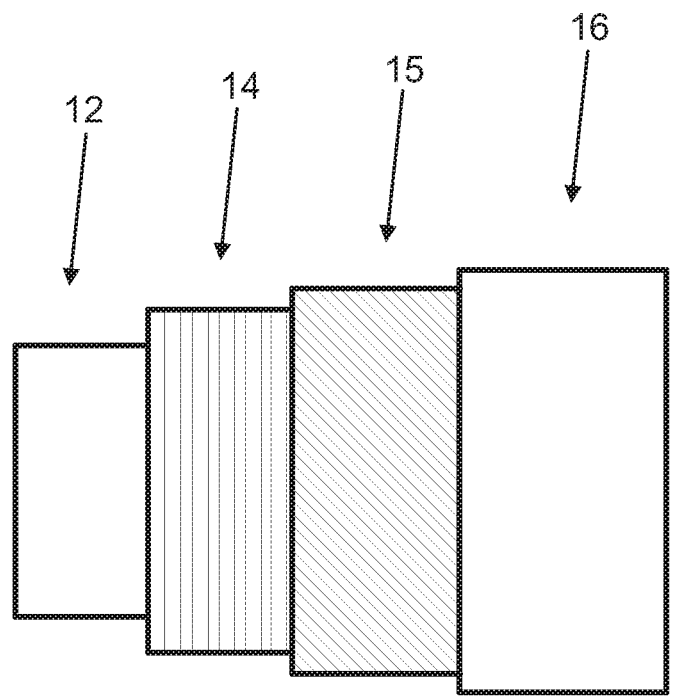
FIG. 2 is a schematic side view of a flexible pipe without a carcass.

FIG. 2 shows another pipe design. This flexible pipe comprises a tubular inner sealing sheath 12 and a pair of outer armouring layers, 14, 15, in the form of profiles and/or strips wound around the inner sealing sheath 12. The two armouring layers are cross wound at an angle to the centre axis of the pipe of close to 55 degrees, typically one of the layers is wound at an angle slightly less than 55 degrees, e.g. between 52 and 55 degrees, and the other one of them is wound at an angle slightly more than 55 degrees e.g. between 55 and 57. The pipe further comprises an outer protective layer 16 protecting the armouring layer mechanically and/or against ingress of sea water.

Between the inner sealing sheath 12 and the outer sheath 16 is provided an annulus, also called an annulus cavity. In this annulus cavity the outer armouring layers 14, 15 are placed. The armouring layers are not fluid tight.

Also this pipe may be a harvesting pipe as described above and comprises a bore defined by the inner sealing sheath 12, which provides a transportation path.

Figure 3:
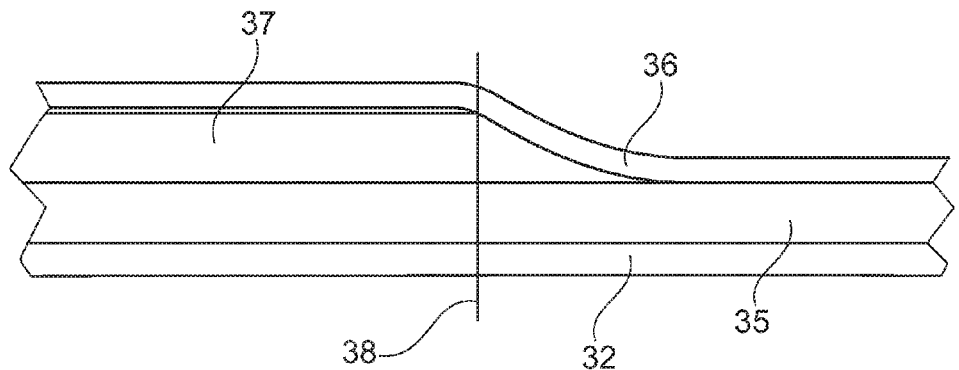
FIG. 3 shows a longitudinal cross section the layers of an embodiment of the flexible pipe.

FIG. 3 shows a cross section along a longitudinal plane of a side wall in an unbonded flexible pipe according to the invention. The pipe comprises a tubular inner sealing sheath 32, an armouring layer 35 and an outer protective layer 36. An insulated length section of the pipe comprises a single thermally insulating layer 37. The thermally insulating layer 37 is here illustrated to be terminated at a distal termination point 38, at a distance from an end of the pipe. A number of suitable isolation materials which can be applied here are known by the skilled person in the art.

At the termination point 38 of the insulation layer, the end is truncated 90°, i.e. perpendicular to the longitudinal length of the flexible pipe. The sheath 32 covers the insulated layer section as well as the non-insulated length section of the pipe. Thus, a void is provided between the lower surface of the sheath 36, the upper surface of the armouring layer 35 and the end surface of the insulation layer 37.

Figure 4:
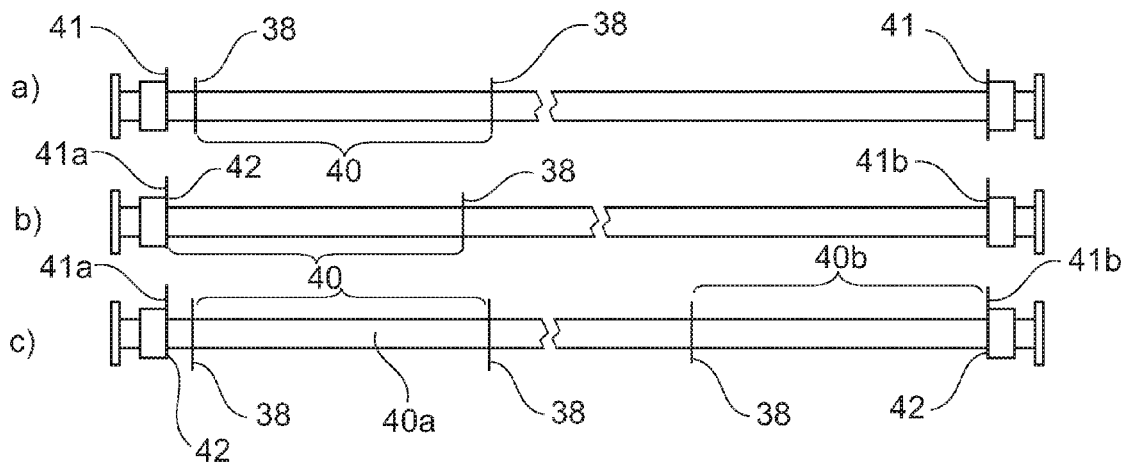
FIG. 4 shows various locations of insulated length sections in embodiments of unbonded flexible pipes according to the invention.

FIG. 4 shows examples of different locations of insulated length sections 40 of pipes according to the invention. FIG. 4a shows a pipe with an insulated length section 40 having two ends 38 at a distance from either ends 41 of the flexible pipe (Type-A insulated length section). FIG. 4b shows a pipe where one end fitting 42 of the insulated length section coincides with or contacts the corresponding end 41a of the pipe at the left side of the figure, whereas the other end 38 of the insulated length section 40 is provided at a distance from the other end 41 b of the pipe (Type-B insulated length section). FIG. 4c shows a pipe having a combination of two insulated length sections 40a, 40b on one pipe, the one being a Type-A insulated length section 40a (as in FIG. 4a), the other being a Type-B insulated length section 40b (as in FIG. 4b) contacting the end fitting 42. The skilled person will realise that many combinations of insulated length sections are possible, such as zero, one, or two Type B insulated length sections, combined with any suitable number of Type A insulated length sections, i.e. zero, one, two, three, etc. At least one insulated length section of either types should or could, however, be used in the pipe.

Figure 5:
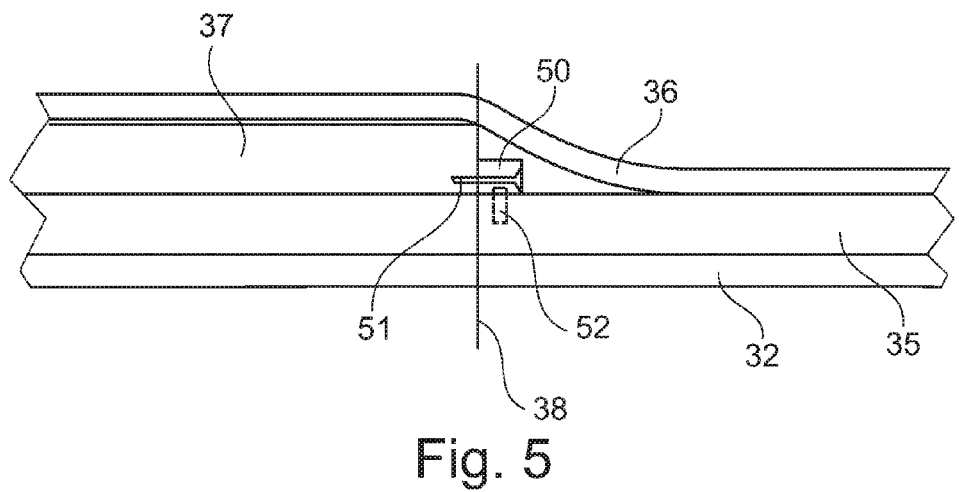
FIG. 5 shows a cross section of layers of an embodiment of the invention.

FIG. 5 shows a cross section corresponding to the one shown in FIG. 3, wherein like reference signs refer to same or similar parts. Thus, only the differences between the two embodiments are discussed here. The thermally insulating layer 37 is here fixed to an insulation anchoring element 50 at the distal termination point 38, provided on the perpendicular plane surface of the insulation layer truncation, within the void provided between the lower surface of the sheath 36, the upper surface of the armouring layer 35 and the plane end insulation layer surface. Fixation of the insulating layer 37 to the element 50 may be achieved in a number of ways, such as by gluing, stitching, screwing, etc. Here, the anchoring element 50 is shown to be fixed by a screw 51. The anchoring element 50 may optionally be fixed to the underlying armouring layer 35 in similar way with a screw 52. In an alternative embodiment, the anchoring element 50 is only fixed to the armouring layer 35, not to the thermally insulating layer 37.

The anchoring element 50 may be made from a polymer, metal or composite material, and the shape of the element is adapted for being suitable as anchoring element, e.g. with one or more corrugations, protruding parts or mating parts in order to mate with the other surfaces, e.g. by means of fastening means, such as a screw or screws. One or more anchoring elements may be provided at each insulation layer end, e.g. one anchoring element extending along the entire radial side of the outer armouring layer, or four anchoring elements spaced mutually with a 90° angle from each other, or twelve smaller size anchoring elements, e.g. screws, one for each angle interval as well as other configurations as may be suitable for the size of pipe, thickness of insulation layer, and type of armouring layer.

Figure 6:
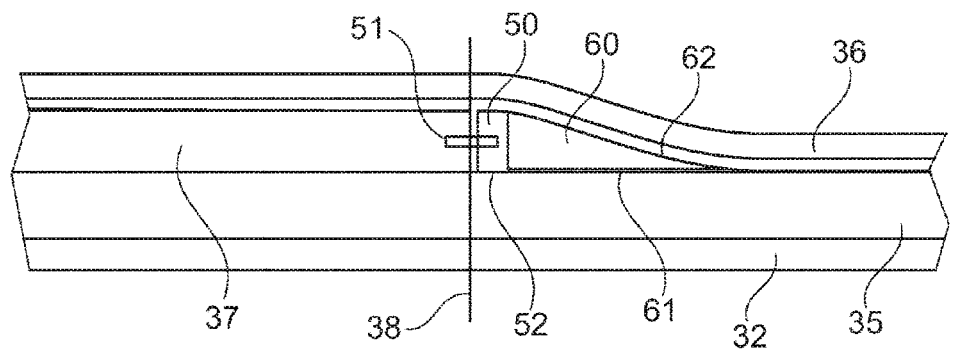
FIG. 6 shows a cross section of layers of an embodiment of the invention.

FIG. 6 shows a cross section corresponding to the ones shown in FIG. 3 and FIG. 5, wherein like reference signs refer to same or similar parts. Thus, only the differences between the embodiments are discussed here. In this embodiment, the anchoring element 50 further comprises a transition ring 60. The transition ring 60 has an inner opening 61 formed by an inner surface of the transition ring, i.e. the surface of the ring which is directed towards the axis of the pipe. An inner part of the flexible pipe, here comprising the inner sealing sheath 32 and the armouring layer 35, passes through the inner opening 61 of the transition ring 60 and is in contact with substantially the entire inner surface of the ring 60. The outer surface 62 of the transition ring 60 is of a determined shape to provide a more gradual transition for the outer part of the pipe, in this case the outer protective layer 36, when passing the termination point 38, compared to the pure i.e. perpendicular truncation as illustrated in FIG. 3. The length of the transition ring 60 in the axial direction of the pipe should preferably be sufficiently long to ensure that the outer part of the flexible pipe is able to conform or adapt to the change in diameter in the transition e.g. in order to be resistant to outer wear or blows. However, the transition ring 60 should preferably be made as short as possible to ensure the flexibility of the pipe. The anchoring element 50 may be integrally formed with the transition ring 60 in a surface thereof, e.g. protruding towards the insulation layer 37 and/or the armouring layer 35, or the transition ring 60 may be formed as one or more transition ring elements, e.g. of different outer diameters, such as gradually decreasing diameters, joined to the anchoring element 50.

Figure 7:
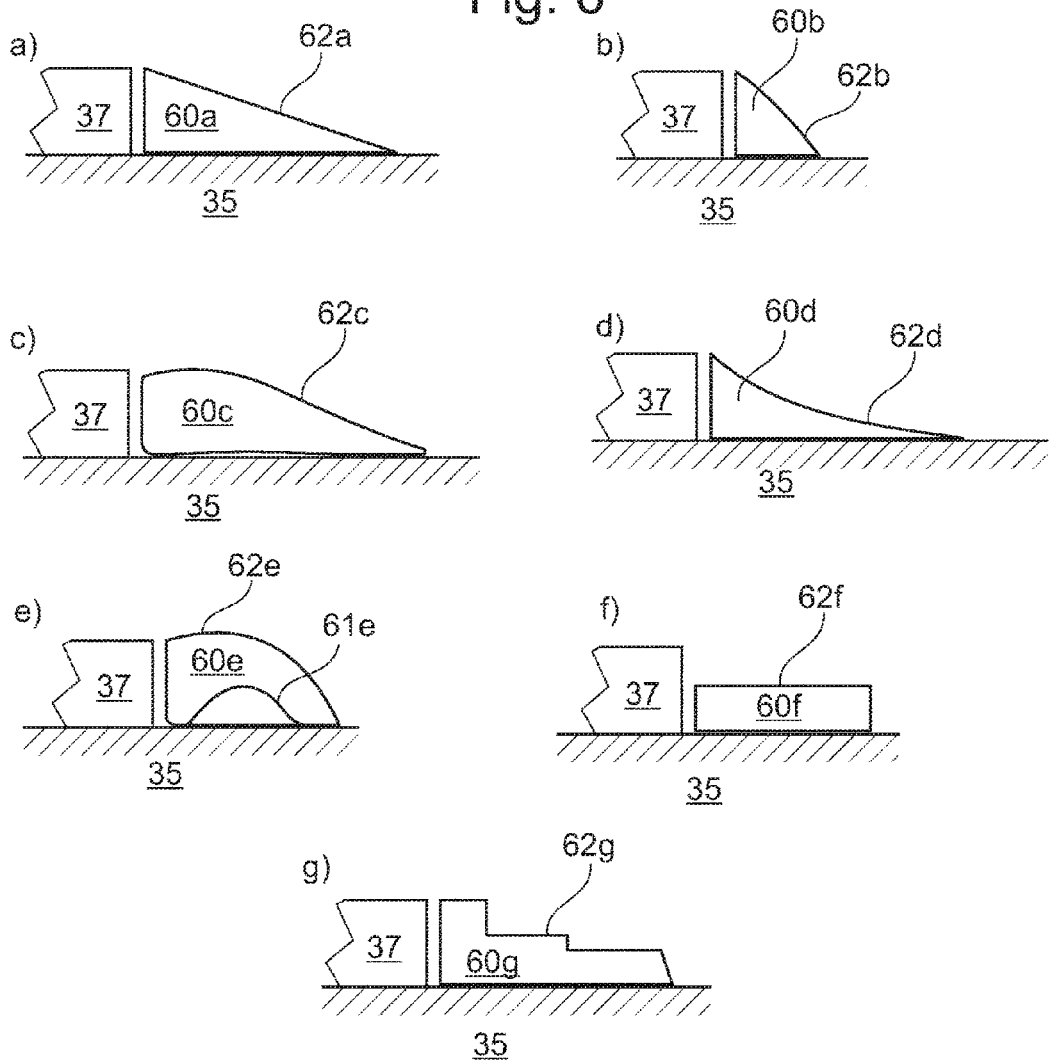
FIG. 7 shows cross sections of embodiments of transition rings according to the invention.

FIG. 7 illustrates various examples of cross sectional outer shapes of the transition ring 60 at one side wall of the pipe, corresponding to the cross sectional view of FIG. 6. The transition rings 60a-g are here illustrated to directly abut the thermally insulating layers 37 and/or the armouring layer 35, but the skilled person will realise that separate anchoring elements may also be used as shown in FIG. 6. FIGS. 7a and 7b show transition rings 60a, 60b having substantially triangular cross sections, with different slopes of the outer surfaces 62a, 62b. The surface 62a is a planar surface, while the surface 62b is slightly curved convex. FIG. 7c shows a ring 60c having an outer surface 62c which is substantially tangential to the outer surfaces of the thermally insulating layer 37 and the armouring layer 35, respectively, at its two ends or end's surfaces in the axial direction of the pipe. The outer surface 62c is seen to extend such that the ring has a height which is a little smaller than the height of the insulation layer 37, and a width approx two times longer than the height of the ring 60c, i.e. a little more than the thermally insulating layer, in the direction away from the armouring layer 35. Further, the material of the ring may comprise a non-slippery polymer or rubber. In this way, and/or by a proper selection of form, size, material of the transition ring may be held in place in the pipe structure simply by the outer protective layer, thus removing or alleviating the need for further fastening means. FIG. 7d shows a transition ring 60d having a slightly concave outer surface 62d which is substantially tangential to the outer surface of the armouring layer 35, but which intersects the outer surface of the insulating layer 37 at a finite angle. Here, the shape of the ring 60d makes it easily attachable to the armouring layer 35 using e.g. one or more screws (not shown) pointing substantially perpendicular to the armouring surface 35. FIG. 7e shows a transition ring 60e having an outer surface 62e with a shape as a part of a torus, i.e. having a cross section which is partly circular. When the outer sheath is applied, the ring 60e, when made from a relatively flexible material, e.g. rubber, is pressed down towards the armouring layer 35, providing an increase contact surface area therebetween. Furthermore, the transition ring 60e is here shown to have the inner opening 61e, formed by the inner surface, which deviates from the substantially cylindrical shapes seen in the other embodiments in FIG. 7. The skilled person will realise that the inner surface may take many alternative shapes in any of the embodiments in FIG. 7 and any combination thereof. FIG. 7f shows a transition ring having a substantially rectangular cross section, providing a simpler solution, which is suitable e.g. when providing a thicker layer of outer sheath material. Finally, FIG. 7g shows a transition ring having a stepped down outer surface 62g. This effect may also be achieved instead providing three different outer rectangular diameter rings, each as shown in FIG. 7f. Note that the examples have here been given for transition rings and thermally insulating layers being located immediately outside an armouring layer 35. This is however not necessarily the case, as the thermally insulating layer may in general be placed anywhere in the pipe structure between the inner sealing sheath and the outer protective layer.

Figure 8:
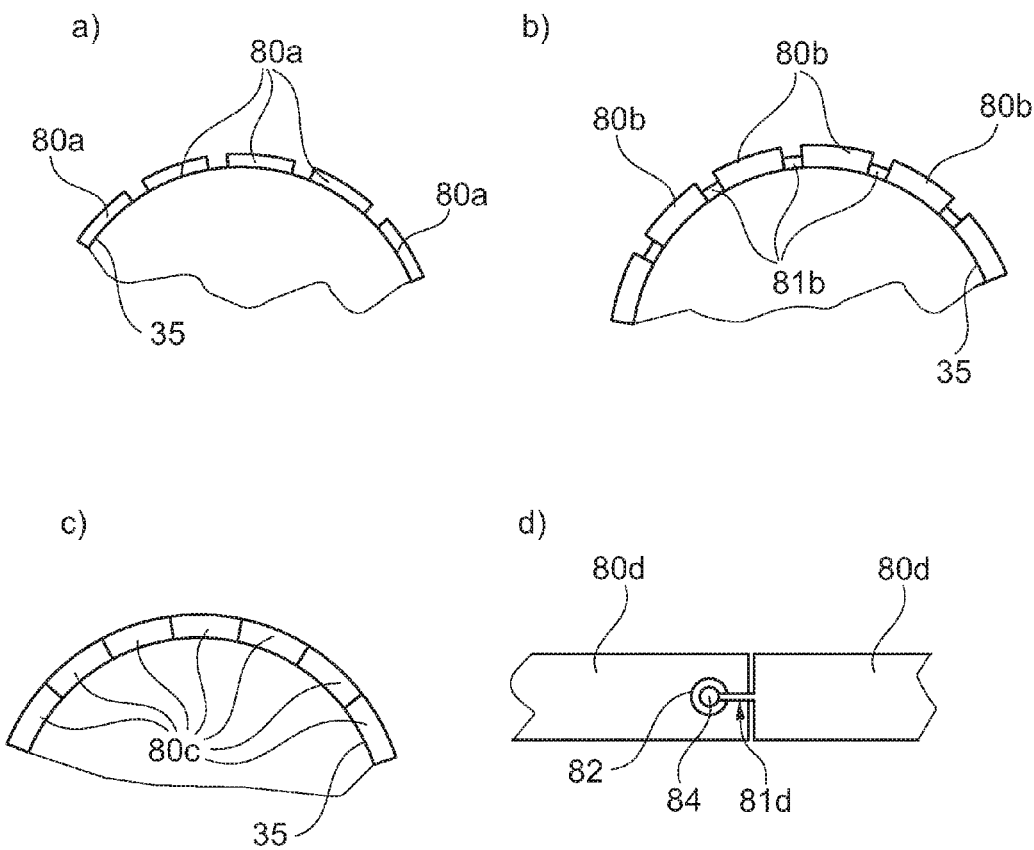
FIG. 8 shows arrangements of transition ring elements.

FIG. 8a-c illustrates parts of axial cross sections of flexible pipes according to the invention showing different configurations of the transition ring, which are comprised as a number of transition ring elements 80, where each of these elements 80 may have the same or different longitudinal cross section shapes, as shown above in FIGS. 7a-7g. FIG. 8a shows the transition ring elements 80a being arranged around the armouring layer 35 in a mutual distance. To keep the individual transition ring elements 80a in position e.g. during production and under operation, each of the elements may be fastened to the thermally insulating layer (not shown) and/or to the armouring layer 35, e.g. by anchoring elements. The transition ring elements 80b in FIG. 8b are also arranged at a mutual distance from each other, but in this embodiment, each of the transition ring elements 80b are fastened to its neighbouring elements by ring fasteners 81b. One or more of the transition ring elements 80b may or may not be fastened to the thermally insulating layer and/or the armouring layer 35. FIG. 8c shows the individual transition ring elements 80c being joined to a substantially continuous transition ring. FIG. 8d shows an example of a fastener 81d arrangement. In this arrangement, the fastener 81d uses a ball 84/socket 82 configuration. The fastener 81d is here illustrated with the two transition ring elements 80d coming in contact, corresponding to the embodiment shown in FIG. 8c. However, the fastener 81d may also be used in embodiments where the transition ring elements 80d are arranged in a mutual distance, corresponding to the embodiment of FIG. 8b. The skilled person will readily recognise that the fasteners 81b, 81d may take many other forms, such as arrangements comprising bolts, resilient clips, flexible bands, etc. Further, interlocking ring elements with a notch/hatch shape are also possible.

EXAMPLE 1

Figure 9:
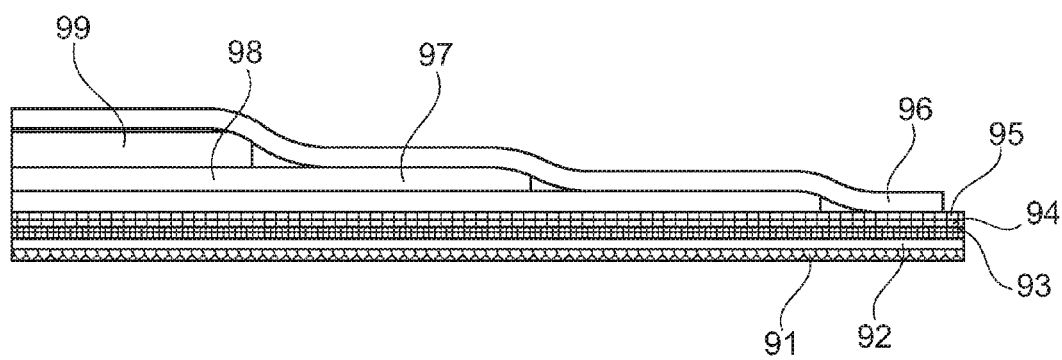
FIG. 9 shows layers of the flexible pipe of example 1.

FIG. 9 shows a cross sectional view along a longitudinal plane of a side wall in an unbonded flexible pipe according to an example of the invention. The unbonded flexible pipe comprises an inner armouring layer 91 ("carcass"), a tubular inner sealing sheath 92, a pressure armouring layer 93, a first and second tensile armour layer 94, 95, and an outer protective layer 96. In this example, the material of the outer protective layer 96 comprises PA11. Furthermore, the flexible pipe comprises three thermally insulating layers along parts of the length of the pipe. The two innermost thermally insulating layers 97, 98 comprise PVDF insulation, each layer having a thickness of approximately 15-17 mm. The outermost thermally insulating layer 99 comprises PP and has a thickness of approximately 30-35 mm. The three thermally insulating layers 97, 98, 99 are terminated at three different termination points along the length of the flexible pipe. This is to ensure that the step in outer diameter does not become excessive. To be compatible with certain production equipments, the distance between the termination points of, e.g. the innermost thermally insulating layer 97 and the middle thermally insulating layer 98 is at least about 8-10 m. However, other production equipments do not have this limitation and are thus able to produce pipes with smaller differences between the termination points of subsequent thermally insulating layers. The arrangement of thermally insulating layers in this specific example is found by calculations to be suitable for insulating a flexible pipe carrying gas with a service temperature of about 125° C. to protect e.g. the PA11 of the outer protective layer from premature aging due to hydrolysis and/or oxidation, especially where the flexible pipe is covered, e.g. by a bend stiffener and/or a guide tube, which are then also protected against the thermal influence from the fluid in the pipe. The unbonded flexible pipe in this example has an outer diameter in the section without a thermally insulating layer of about 340 mm.

EXAMPLE 2

This example concerns an unbonded flexible pipe for use as a riser with a guide tube terminated by a bending stiffener. The flexible pipe has an insulated length section (not shown) corresponding to the combined length of the riser guide tube and the bending stiffener, i.e. the upper part of the flexible pipe in order to protect the outer protective layer of the pipe and/or the bending stiffener against overheating from a hot fluid in the pipe bore. The flexible pipe is a rough-bore-type as it has a carcass provided as a folded profile. The pipe has an inner diameter (ID) of 9 inches. Outside the carcass an inner sealing sheath is provided for maintaining the fluid integrity of the flexible pipe. A pressure armouring layer is provided outside the inner sealing sheath as a wound layer of metal profiles. Two layers of cross wound metallic tensile armouring elements are located outside the pressure armouring layer. An insulated length section of the pipe towards an end thereof is provided with two thermally insulating layers, whereof one being an innermost insulating layer and one being an outermost insulating layer. The innermost thermally insulating layer has a thickness of about 32 mm of PVDF insulation wound to form a substantially continuous layer between the end of the pipe and a termination point approximately 50 m from the pipe end. The insulating layer is made from a number of overlapping windings of an insulating tape with a thickness of about 2 mm. At the termination point, the layer is tapered approximately linearly down to termination, i.e. the layer does not exist in the pipe structure away from the insulated length section. The outermost insulating layer has a thickness of about 32 mm and is also terminated approximately 50 m from the pipe end by tapering. The layer is made from a number of overlapping windings of an insulating tape made from PP, with a tape thickness of about 2 mm. Both insulating layers are tapered down to provide a gradual transition at the termination point, and together form a cone-shaped transition section with a length of about 0.5 m. The outer protective layer is provided as an outer polymer sheath outside the thermally insulating layers (within the insulated length section) or outside the outermost of the tensile armouring layer (away from the insulated length section). The outer protective layer is extruded along substantially the full length of the flexible pipe by conventional means to have a thickness of approximately 12 mm. The outer protective sheath is in this case made from PA11.

Figure 10:
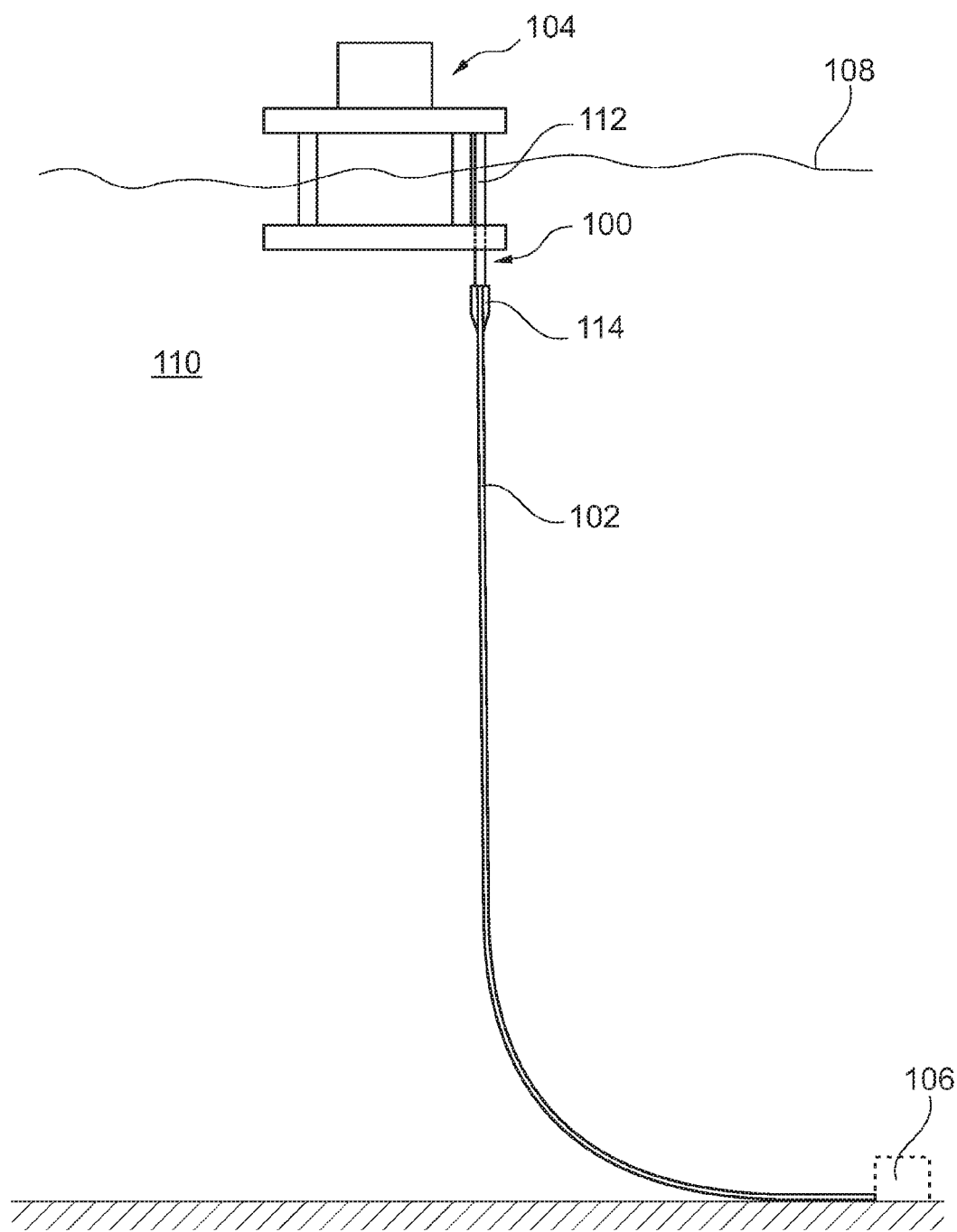
FIG. 10 shows an embodiment of the flexible pipe system.

FIG. 10 schematically shows the flexible pipe system of the invention in use. The flexible pipe system 100 comprises an unbonded flexible pipe 102 of the invention, which is deployed in a riser configuration. Here for the sake of example shown in the free-hanging configuration, while other configurations, such as steep-S, lazy-S, steep wave or lazy wave configurations are also anticipated. The flexible pipe 102 connects a subsea installation 106, such as a well head, located on a sea floor 107, with a production unit 104, here in the form of a semi-submersible production platform, on a sea surface 108. The flexible pipe is here shown to be freely hanging in the substantial part of the water 110. In proximity of the sea surface 108, the flexible pipe 102 is guided in a guide tube 112, here shown as an I-tube. At a lower end of the riser guide tube 112, the flexible pipe 102 is protected from over-bending by a bend stiffener 114. Both the guide tube 112 and the bend stiffener 114 are examples of ancillary components, and are as such in this case part of the flexible pipe system. The insulated length section of the flexible pipe 102 is preferably arranged to coincide with the length section of the flexible pipe 102 that is guided in the guide tube 112 and the length section covered by the bend stiffener 114, i.e. the combined interaction length sections of the two ancillary components. The insulated length section may also be arranged to only comprise part of the guide tube 112 and/or the bend stiffener 114.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims. For example, the unbonded flexible pipes have been shown to be terminated with end fittings, however termination in any other way is also possible without deviating from the scope of the invention. Additionally, many of the unbonded flexible pipe embodiments have been shown having only one armouring layer, however, in other embodiments, the pipes comprises a multitude of armouring layers as known in the art.

What is claimed is:
1. An unbonded flexible pipe having a length along a longitudinal axis, a first pipe end, a second pipe end, and comprising a plurality of whole length layers extending from the first pipe end to the second pipe end, the plurality of whole length layers comprising at least a tubular inner sealing sheath, at least one armour layer, and an outer protective layer, the unbonded flexible pipe further comprises at least one thermally insulating layer arranged between the internal sealing sheath and the outer protective layer in an insulated length section, the flexible pipe comprising an inner part comprising at least the internal sealing sheath and any other whole length layers being internal to the thermally insulating layer, the flexible pipe further comprising an outer part comprising at least the outer protective layer and any other whole length layers being external to the thermally insulating layer, wherein the at least one thermally insulating layer is terminated at a distal termination point, the distal termination point being in a distance from at least one of the first and the second pipe end of the unbonded flexible pipe and the at least one thermally insulating layer terminates at a distance from at least one end fitting of the pipe.

2. The unbonded flexible pipe according to claim 1, wherein the unbonded flexible pipe comprises at least one thermally insulated pipe section comprising the at least one thermally insulating layer and at least one non-insulated pipe section without a thermally insulating layer.

3. The unbonded flexible pipe according to claim 1, wherein the unbonded flexible pipe comprises a first end fitting at its first pipe end and a second end fitting at its second pipe end, the plurality of whole length layers are fixed to the first and the second end fitting, the at least one thermally insulating layer is not directly fixed to the first and/or the second end fitting.

4. The unbonded flexible pipe according to claim 1, wherein the at least one thermally insulating layer has a first and a second insulating layer end, the first insulating layer end is closer to the first pipe end and the second insulating layer end is closer to the second pipe end, wherein the first insulating layer end optionally is fixed to a first end fitting and the second insulating layer end has a second end fitting distance along the length of the pipe to a second end fitting.

5. The unbonded flexible pipe according to claim 1, wherein the insulated length section has a length of about 95% or less.

6. The unbonded flexible pipe according to claim 1, wherein at least one of the first pipe end and second pipe end is connected to the end fitting such that the plurality of whole length layers are fixed to the end fitting, and the at least one thermally insulating layer is not fixed to the end fitting.

7. The unbonded flexible pipe according to claim 1, wherein the at least one thermally insulating layer is truncated at the distal termination point.

8. The unbonded flexible pipe according to claim 1, wherein the at least one thermally insulating layer is in contact with or in close proximity to an anchoring element at the distal termination point and wherein the anchoring element is fixed to the thermally insulating layer.

9. An unbonded flexible pipe having a length along a longitudinal axis, a first pipe end, a second pipe end, and comprising a plurality of whole length layers extending from the first pipe end to the second pipe end, the plurality of whole length layers comprising at least a tubular inner sealing sheath, at least one armour layer, and an outer protective layer, the unbonded flexible pipe further comprises at least one thermally insulating layer arranged between the internal sealing sheath and the outer protective layer in an insulated length section, the flexible pipe comprising an inner part comprising at least the internal sealing sheath and any other whole length layers being internal to the thermally insulating layer, the flexible pipe further comprising an outer part comprising at least the outer protective layer and any other whole length layers being external to the thermally insulating layer, wherein the at least one thermally insulating layer is terminated at a distal termination point, the distal termination point being in a distance from at least one of the first and the second pipe end of the unbonded flexible pipe, wherein the at least one thermally insulating layer is in contact with or in close proximity to an anchoring element at the distal termination point and wherein the anchoring element is fixed to the thermally insulating layer, and wherein the anchoring element is movable over an outermost layer of the inner part.

10. The unbonded flexible pipe according to claim 8, wherein the anchoring element is fixed to an outermost layer of the inner part or to an innermost layer of the outer part.

11. The unbonded flexible pipe according to claim 8, wherein the anchoring element comprises a tape.

12. An unbonded flexible pipe having a length along a longitudinal axis, a first pipe end, a second pipe end, and comprising a plurality of whole length layers extending from the first pipe end to the second pipe end, the plurality of whole length layers comprising at least a tubular inner sealing sheath, at least one armour layer, and an outer protective layer, the unbonded flexible pipe further comprises at least one thermally insulating layer arranged between the internal sealing sheath and the outer protective layer in an insulated length section, the flexible pipe comprising an inner part comprising at least the internal sealing sheath and any other whole length layers being internal to the thermally insulating layer, the flexible pipe further comprising an outer part comprising at least the outer protective layer and any other whole length layers being external to the thermally insulating layer, wherein the at least one thermally insulating layer is terminated at a distal termination point, the distal termination point being in a distance from at least one of the first and the second pipe end of the unbonded flexible pipe, wherein the at least one thermally insulating layer is in contact with or in close proximity to an anchoring element at the distal termination point and wherein the anchoring element is fixed to the thermally insulating layer, and wherein the anchoring element comprises a transition ring having an inner opening corresponding to the inner part of the flexible pipe, the inner part passing through the inner opening, the transition ring having an outer surface, the outer surface being configured to provide a gradual transition in a diameter to the layers of the outer part from the insulated length section at the distal termination point.

13. The unbonded flexible pipe according to claim 12, wherein the transition ring has a cross-section in an axial cross-section of the pipe, the cross-section having an outer shape being substantially triangular, a first side of the substantially triangular cross-section corresponding to an outer surface of the inner part of the pipe, a second side corresponding to a thickness of the thermally insulating layer, and the third side being the outer surface.

14. The unbonded flexible pipe according to claim 12, wherein the transition ring comprises two or more transition ring elements in a stepped-down configuration of reduced outer diameters.

15. The unbonded flexible pipe according to claim 1, wherein the thermally insulating layer is arranged between the armour layer and the outer protective layer.

16. The unbonded flexible pipe according to claim 1, wherein the unbonded flexible pipe comprises more than one armour layer, the thermally insulating layer being arranged between an outermost armour layer and the outer protective layer.

17. The unbonded flexible pipe according to claim 1, wherein the outer part consists of the outer protective layer.

18. The unbonded flexible pipe according to claim 1, wherein the insulated length section has a length of about 100 m or less.

19. The unbonded flexible pipe according to claim 1, wherein the at least one thermally insulating layer comprises PVDF, PP, PVC, or PU.

20. The unbonded flexible pipe according to claim 1, wherein the outer protective layer comprises a material in the group of PA11, PE, MDPE, HDPE, PA12, or PEX.

21. The unbonded flexible pipe according to claim 1, wherein the thermally insulating layer comprises PVDF and/or PP and has a thickness from about 1 mm to about 100 mm.

22. The unbonded flexible pipe according to claim 1, wherein the pipe in a cross-section comprises at least a first thermally insulating layer having at least one first distal termination point and second thermally insulating layer having at least one second distal termination point.

23. A flexible pipe system comprising an unbonded flexible pipe according to claim 1 and an ancillary component, the ancillary component being attached to or arranged in a close proximity to the flexible pipe over an interaction length section of the pipe, and wherein the insulated length section of the pipe comprises at least a part of the interaction length section.

24. The flexible pipe system according to claim 23, wherein the ancillary component is chosen from the group of: a guide tube, a bend limiter, a bend stiffener, a bellmouth, a bend restrictor, a connector, a sub-sea buoy, a buoyancy module, a clamping device, a riser base, a tether base, or a riser hang-off structure.

25. The flexible pipe system according to claim 23, wherein the ancillary component is any component or structure arranged on a surface of the unbonded flexible pipe or in proximity to the surface along a part of the length of the pipe, wherein the ancillary component during use of the pipe system reduces heat transfer from the pipe surface to a pipe surrounding along the interaction length section.

26. The flexible pipe system according to claim 23, wherein the ancillary component is a bend stiffener configured to limit bending in a stiffened region of the unbonded flexible pipe, the interaction length section comprising the stiffened region, and wherein the insulated length section comprises at least a part of the stiffened region.

27. The flexible pipe system according to claim 26, wherein the bend stiffener is connected to an end fitting, the end fitting being connected to the unbonded flexible pipe.

\* \* \* \* \*

UNITED STATES PATENT AND TRADEMARK OFFICE
CERTIFICATE OF CORRECTION

PATENT NO.       : 9,441,780 B2
APPLICATION NO.  : 14/116838
DATED            : September 13, 2016
INVENTOR(S)      : Andersen et al.

Page 1 of 1

It is certified that error appears in the above-identified patent and that said Letters Patent is hereby corrected as shown below:

On the title page:

Item 73, Assignee: please delete "OILWEKK" and replace it with -- OILWELL --

Signed and Sealed this
Thirteenth Day of December, 2016

Michelle K. Lee
*Director of the United States Patent and Trademark Office*